United States Patent [19]

Savino et al.

[11] Patent Number: 5,145,293
[45] Date of Patent: Sep. 8, 1992

[54] POWDER PICKUP DEVICE WITH EXTENDED LIFE

[75] Inventors: James J. Savino, Ridge; Anthony J. Rotolico, Hauppauge; Mark F. Spaulding, Northport; Richard A. Goering, Huntington, all of N.Y.

[73] Assignee: The Perkin-Elmer Corporation, Norwalk, Conn.

[21] Appl. No.: 610,484

[22] Filed: Nov. 7, 1990

[51] Int. Cl.⁵ .............................................. B65G 53/04
[52] U.S. Cl. ................................... 406/193; 406/122
[58] Field of Search ............................... 406/193, 122

[56] References Cited

U.S. PATENT DOCUMENTS

| | | |
|---|---|---|
| 1,246,189 | 11/1917 | Vanderlip ...................... 406/193 X |
| 2,707,132 | 4/1955 | Baresch . |
| 4,561,808 | 12/1985 | Spaulding et al. . |
| 4,900,199 | 2/1990 | Spaulding et al. . |

FOREIGN PATENT DOCUMENTS

| | | |
|---|---|---|
| 85815 | 3/1921 | Austria .............................. 406/193 |
| 434680 | 9/1926 | Fed. Rep. of Germany ...... 406/193 |

Primary Examiner—Margaret A. Focarino
Assistant Examiner—Gary C. Hoge
Attorney, Agent, or Firm—H. S. Ingham; E. T. Grimes

[57] ABSTRACT

A powder pickup device has a tube formed of an elastomeric tube wall with an orifice therein receptive of powder from a vessel so as to direct powder into a carrier gas in a central passage in the tube. A tubular shell supports the tube and has an aperture therein aligned with the orifice. In another embodiment the tube is combined of a rigid tube and an elastomeric tube fitted tandemly in the shell. The rigid tube extends to an inner end proximate the aperture and has the orifice situated therein. The elastomeric tube extends from the rigid tube and is disposed so as to place a section thereof opposite the orifice.

9 Claims, 2 Drawing Sheets

POWDER PICKUP DEVICE WITH EXTENDED LIFE

This invention relates to powder feeding systems, such as for use with thermal spray guns, and particularly to a powder pickup device situated in a powder hopper.

BACKGROUND OF THE INVENTION

Powder feeders are utilized for a wide variety of different applications. One such application is feeding powder into a thermal spray gun which utilizes a combustion flame or arc plasma for melting and propelling the powder to produce a coating on a workpiece. Typical powder feeders for this application are disclosed in U.S. Pat. Nos. 4,561,808 and 4,900,199 of the present assignee.

Such powder feeders comprise a hopper for the powder, with a powder pickup tube passing through or adjacent to the lower part of the hopper. A carrier gas, such as air, nitrogen or other gas compatible with the spray gun or other operation, is forced under pressure through a central passage in the tube. An orifice in the tube wall picks up powder from the hopper for entrainment in the carrier gas and thence conveyance to a thermal spray gun or other point of utilization. A second gas generally is supplied into the hopper to aid in the pickup of powder into the orifice. Control of the pressure or flow of the pickup gas may serve to regulate powder feed rate. The powder pickup tube may have a complex configuration such as a venturi in the vicinity of the powder orifice to aid in drawing in powder.

Some feeders include a mechanical device such as a wheel, screw or disk to feed powder at a controlled rate through an orifice into the carrier gas. Other feeders utilize valves to shut off the flow of powder. For example U.S. Pat. No. 2,707,132 discloses a sliding gate covered with a layer of wear-resistant rubber. The aforementioned U.S. Pat. No. 4,900,199 discloses an elastomer pinch valve closed by application of gas pressure outside the valve, and also discloses an elastomer check valve.

Powders such as those used in thermal spraying can be abrasive to components in a feeding device. Typical of these powders are metals, oxide ceramics and carbides, which generally are in a size range between about 5 and 150 microns. In configurations of feeders where entrainment of the powder by a feed gas into the carrier gas necessarily entails impinging powder against the pickup tube wall, the wall erodes away so as to limit the life of the pickup tube. This can be costly from the standpoints of both replacement parts and down time.

SUMMARY OF THE INVENTION

Therefore, an object of the present invention is an improved powder pickup device that is resistant to wear and erosion by the powder and thereby has an extended life. Another object is a novel powder pickup device for use in a powder feeding system of the type that has a powder pickup tube cooperative with a powder hopper, a supply of carrier gas and a powder feed gas.

These and other objects are achieved with a powder pickup device including tube means having an axial passage therethrough for channelling a carrier gas from an outer end thereof. The tube means comprises a tube wall with an orifice therein receptive of powder from a powder vessel so as to direct powder into the passage for conveyance by the carrier gas toward a point of powder utilization. The tube wall includes an elastomeric section thereof positioned opposite the orifice so that powder directed through the orifice impinges on the elastomeric section.

Preferably the device further comprises a tubular shell that supports the tube means and has an aperture therein aligned with the orifice. In one embodiment the tube wall is formed substantially of elastomer.

In another embodiment the tube means comprises a rigid tube and an elastomeric tube fitted tandemly in the shell. The rigid tube extends from the outer end to an inner end proximate the aperture and has a side wall with the orifice situated therein and aligned with the aperture so that the orifice is receptive of the powder via the aperture. The elastomeric tube includes the elastomeric section and extends from the rigid tube.

DETAILED DESCRIPTION OF THE INVENTION

A powder pickup device based on the present invention may be utilized with essentially any powder feeding system of the type that has a powder pickup passage cooperative with a powder hopper, a supply of carrier gas, and a powder feed gas or other means for injecting powder into the passage. Such feeders are described, for example, in the aforementioned U.S. Pat. Nos. 4,900,199 and 4,561,808. For simplicity the invention is presented herein with respect to the feeder of the latter patent.

Figure 1:
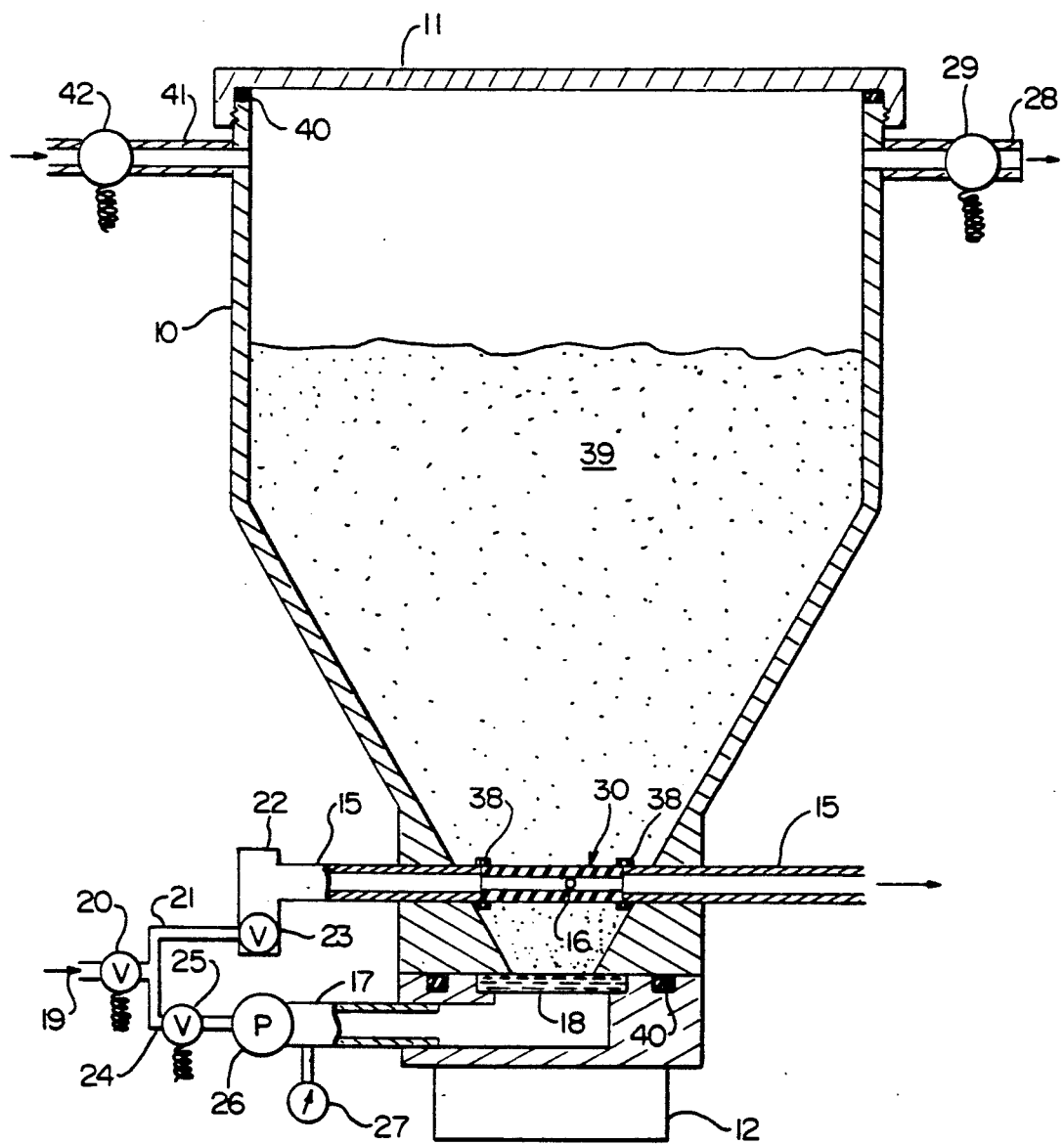
FIG. 1 is a simplified schematic illustration in vertical section of a powder feeder incorporating the invention.

With reference to FIG. 1, a supply hopper 10 contains any typical thermal spray powder 39. The hopper has an inlet cover 11 for the periodic addition of powder. It can be equipped with a vibrator 12 which is used, as necessary, to maintain the powder in loose free-flowing form and permeable to the passage of gas. The hopper is capable of being pressurized and is sealed appropriately with O-rings 40 or the like.

Passing through the bottom portion of the hopper is a carrier gas conduit 15 incorporating a powder pickup device 30 which has a powder intake orifice 16 within the hopper below the level of the powdered solids. Feed gas is admitted into the bottom of the hopper by a conduit 17 and passes through the static mass of solids to a zone of fluidization. Powder is entrained by the feed gas through the orifice 16 and into the carrier conduit 15 where the carrier gas conveys the powder to a thermal spray gun (not shown) or other point of utilization. A porous member 18 is located at the entrance of the feed gas conduit 17 into the hopper so as to diffuse the feed gas into the powder in the hopper.

Gas is supplied from a gas source (not shown) to the system by way of line 19, which has a solenoid shut-off valve 20 therein. A portion of the gas is passed to the carrier gas conduit 15 through branch conduit 21 and flowmeter 22 which has a control valve 23 for metering a desired, constant mass flow rate of gas through the carrier gas conduit 15.

A second and smaller portion of the gas supply is passed through branch conduit 24, solenoid shut-off valve 25 and pressure regulator 26 into the feed gas conduit 17. The pressure regulator is preset to maintain a supply of feed as into the hopper at a relatively low, constant relative pressure, for example, in the range of 0.035 to 0.7 kg/cm$^2$ (0.5 to 10 psi). The pressure regulator controls the powder feed at a constant rate by the regulated amount of feed gas, the amount of powder being controlled responsive to the back pressure from the conveying gas line downstream of the point of powder introduction. A pressure gage 27 connected to the feed gas conduit 17 may be provided as a relative indicator of powder feed rate. A vent 28 near the top of hopper 10 is used to vent the hopper when the feed gas is shut off. A solenoid valve 29 is provided for the purpose.

A powder pickup device 30 of a desired design with orifice 16 is attached into the carrier conduit 15 in any desired or known manner such as with threaded fittings or the like (shown schematically as 38 in FIG. 1) so as to constitute a portion of the carrier conduit. The device is positioned in the hopper below the normal minimum level of powder.

Figure 2:
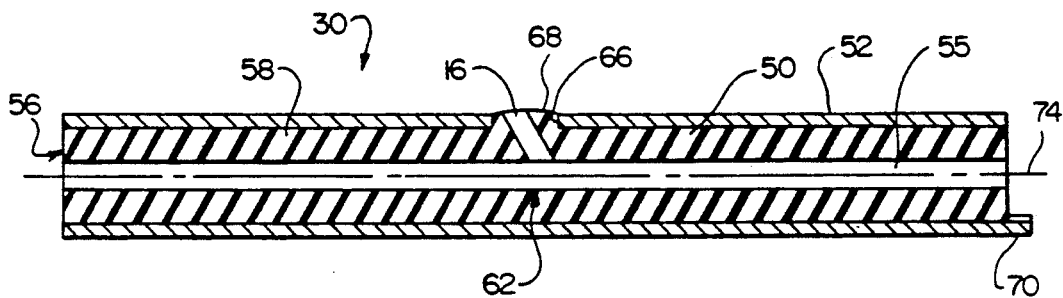
FIG. 2 is a longitudinal section in a horizontal plane of an embodiment of the invention.

In one embodiment, FIG. 2, the pickup device 30 consists of a tube 50 and, advantageously, a tubular shell 52 to support the tube. The tube has an axial passage 55 therethrough for channelling the carrier gas from an outer end 56 thereof. The tube is constructed of a tube wall 58 with an orifice 16 situated therein receptive of powder 39 from the powder vessel 10 (FIG. 1) so as to direct powder into the passage for conveyance by the carrier gas. The tube wall is formed of an elastomer, particularly in a section 62 disposed opposite the orifice so that powder directed through the orifice impinges on the resilient section. The elastomer is generally a rubber-type of material, such as and preferably a natural rubber, which is resistant to wear by the impinging abrasive powder. Conveniently the entire tube is an elastomer as shown, although alternatively only the section 62 may be formed of a rubber insert or liner.

The tubular shell 52 has an aperture 66 therein which also is receptive of the powder from the vessel. The tube 50 is fitted snugly through the shell with the orifice 16 aligned with the aperture 66 so that the orifice is receptive of the powder via the aperture. Preferably the aperture is larger in diameter than the orifice, and the tube wall has a protrusion 68 centered over the orifice. The protrusion fits into the aperture 66 to position the tube 50 in the shell 52.

The shell and the elastomeric tube are substantially the same length and are aligned axially. Thus the rigid shell of the device 30 may be attached conventionally in the feeder (FIG. 1). A lip 70 on one end of the tube fits into a matching indentation (not shown) at the attachment 38, to orient the device properly on its axis 74 in the feeder.

Figure 3:
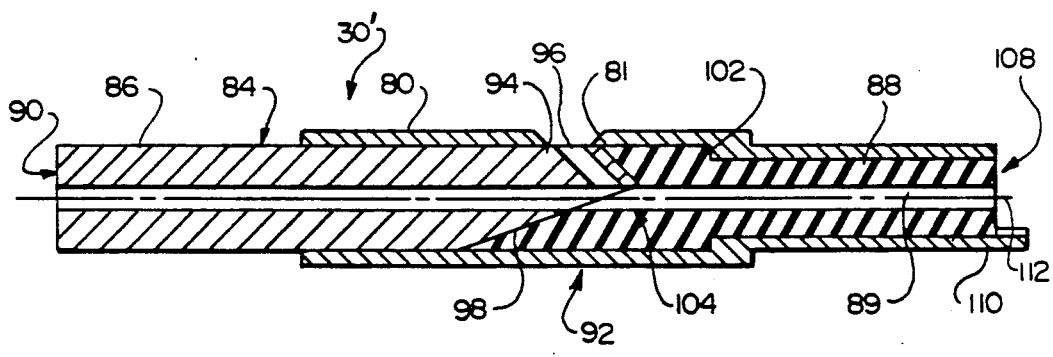
FIG. 3 is a longitudinal section in a horizontal plane of another embodiment of the invention.

Another embodiment is shown as device 30' in FIG. 3 (substituting for device 30 of FIG. 2). A tubular shell 80 has an aperture 81 therein. A tube means 84 comprises a rigid tube 86, of stainless steel or the like, and an elastomeric tube 88 fitted tandemly in the shell 80. A passage 89 for the carrier gas extends through the tube means. The tube 86 is formed of a rigid material, such as stainless steel or a firm plastic, extending from the outer end 90 to an inner end 92 proximate the aperture 81. The rigid tube has a side wall 94 with an orifice 96 situated therein aligned with the aperture, so that the orifice is receptive of the powder from the vessel via the aperture. With the aperture being slightly larger than the orifice, alignment is readily attained.

Tube 88 is formed of elastomeric material such as natural rubber.

The mating ends 98 of the tubes 86,88 are configured oppositely to match, and tube 88 extends from the inner end 92 of the rigid tube toward the point of utilization (rightward in the drawing).

The elastomeric tube 88 has a shoulder 102 thereon and the shell wall 82 has a corresponding shoulder therein for positioning the tube means axially in the shell. Conveniently for construction, the shell 80 is affixed by crimping or cementing onto the rigid tube 86 which is urged lightly against the elastomeric tube 88 to maintain a seal and continuity in the passage 89 at the juncture 98 of the tubes.

The mating configuration at the juncture is such that a section 104 of the elastomeric tube is disposed opposite the orifice 81 so that powder directed through the orifice impinges on the resilient section. This may be effected as shown with a bias or overlap in the mating surfaces 98 at the juncture.

The outside end 108 of the elastomeric tube is aligned with the shell which is attached suitably in the feeder (FIG. 1). The outer end 90 of the rigid tube also may be aligned with the shell, or may extend past the shell as shown, and is attached similarly. A lip 110 on one end of the tube serves to orient the device on its axis 112.

In each of the examples of FIGS. 2 and 3, the orifice (16 or 96) has an acute angle to the passage (55 or 89), advantageously about 45°. The orifice also should be angled forwardly, i.e. in the direction of carrier flow, so that the powder is directed into the passage with a flow component away from the outer end, to further minimize impact and wear. As examples, the passage is 1.2 mm and the orifice is 1.1 mm. Dimensions and angle may vary according to circumstances. Also there may be more than one orifice-aperture pair, as disclosed in the aforementioned U.S. Pat. No. 4,561,808. The pickup tube may incorporate other known or desired features such as a venturi constriction, or the feeder may incorporate mechanical aids for the metering of powder.

It will be appreciated that, in broad aspects of the invention, the device basically comprises tube means with a carrier gas passage and a powder orifice as described above, with at least a section of tube formed of resilient material disposed opposite the orifice so that powder directed through the orifice impinges on the resilient section. Such an arrangement minimizes wear or erosion by the abrasive powder at a point where the powder stream is deflected into passage with the carrier gas.

Further advantages of the embodiment of FIG. 2 are simplicity and low cost of manufacture, as the rubber tube is merely pulled into the shell until its protrusion fits into the aperture. The embodiment of FIG. 3 also is relative low in cost, and a precision orifice is more easily drilled in the rigid tube.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

What is claimed is:

1. A powder pickup device with extended life, comprising a tubular shell with an aperture therein, and an elastomeric tube having an axial passage therethrough for channelling a carrier gas from an outer end thereof, the elastomeric tube being fitted through the shell with the orifice aligned with the aperture so that the orifice is receptive of the powder via the aperture, the elastomeric tube having a tube wall with an orifice therein receptive of powder from a powder vessel so as to direct powder into the passage for conveyance by the carrier gas toward a point of powder utilization, and the elastomeric tube further having an elastomeric section positioned opposite the orifice so that powder directed through the orifice impinges on the elastomeric section, wherein the aperture is larger in diameter than the orifice, and the tube wall has a protrusion centered over the orifice, the protrusion fitting into the aperture to position the elastomeric tube in the shell.

2. The device according to claim 1 wherein the orifice has an acute angle to the passage.

3. The device according to claim 2 wherein the orifice is angled so that the powder is directed with a component away from the outer end.

4. A powder pickup device with extended life, comprising tube means having an axial passage therethrough for channelling a carrier gas from an outer end thereof, the tube means comprising a tube wall with an orifice therein receptive of powder from a powder vessel so as to direct powder into the passage for conveyance by the carrier gas toward a point of powder utilization, the device further comprising a tubular shell with an aperture therein, the tube means further comprising a rigid tube and an elastomeric tube fitted tandemly in the shell, the rigid tube extending from the outer end to an inner end proximate the aperture and including the tube wall with the orifice situated therein aligned with the aperture so that the orifice is receptive of the powder via the aperture, the elastomeric tube extending from the inner end of the rigid tube and including an elastomeric section positioned opposite the orifice so that powder directed through the orifice impinges on the elastomeric section.

5. The device according to claim 4 wherein the inner end is configured with a bias so as to position the elastomeric section opposite the orifice.

6. The device according to claim 4 wherein the elastomeric tube has a shoulder thereon and the shell has a corresponding shoulder therein for positioning the tube means axially in the shell, and the shell is affixed on the rigid tube with the rigid tube being urged against the elastomeric tube.

7. The device according to claim 4 wherein the aperture is larger in diameter than the orifice.

8. The device according to claim 4 wherein the orifice has an acute angle to the passage.

9. The device according to claim 8 wherein the orifice is angled so that the powder is directed with a component away from the outer end.

* * * * *